United States Patent

[11] 3,560,724

| | | |
|---|---|---|
| [72] | Inventor | William J. Condell, Jr.<br>Bethesda, Md. |
| [21] | Appl. No. | 753,371 |
| [22] | Filed | Aug. 19, 1968 |
| [45] | Patented | Feb. 2, 1971 |
| [73] | Assignee | the United States of America as represented by the Secretary of the Navy |

[54] OPTICAL CORRELATORS
2 Claims, 5 Drawing Figs.

[52] U.S. Cl. .................................................. 235/181,
250/219, 310/8.1, 333/30
[51] Int. Cl. .................................................. G06f 15/34,
G06g 7/19, G02b 24/00
[50] Field of Search .......................................... 235/181;
333/30, 72; 250/211, 199; 310/8.1

[56] References Cited
UNITED STATES PATENTS

| 3,400,341 | 9/1968 | Sittig II | 330/30 |
| 3,409,848 | 11/1968 | Meitzler et al. | 330/30 |
| 3,444,482 | 5/1969 | Becker | 330/30X |

*Primary Examiner*—Malcolm A. Morrison
*Assistant Examiner*—Felix D. Gruber
*Attorneys*—R. I. Tompkins and L. I. Shrago

ABSTRACT: In one type of optical correlator disclosed, a Raleigh surface wave coded in accordance with electrical signal information is propagated down a solid, light-conducting member and changes the boundary surface of this member so as to permit light which is normally being propagated therethrough in a substantially total internal reflected mode to emerge therefrom and impinge on a spaced correlation mask. If the coded surface wave and the mask codings are in agreement, a maximum amount of light will leave the solid member, pass through transparent sections of the mask and arrive at a photodetector.

INVENTOR.
WILLIAM J. CONDELL, Jr.

INVENTOR.
WILLIAM J. CONDELL, Jr.

OPTICAL CORRELATORS

The invention described herein may be manufactured and used by or for the Government of the United States of America for governmental purposes without the payment of any royalties thereon or therefor.

Optical correlators or matched filters are utilized in communication systems and in pulse coded radar systems in order to provide enhanced detection of the signals in the presence of noise, jamming or other masking conditions. In one type of optical correlator, circularly polarized light is sent through a delay line which is excited by an acoustic wave train-carrying coded signal information. The perturbations in the delay line change the orientation of the polarization vector. This variation is sensed by a coded mask, and an instantaneous pulse of light is detected whenever the acoustic wave train is properly aligned with the coding mask.

Such a system as the one just generally described, however, requires high quality optics, polarizing elements and a precision optical delay line. This line must possess high dimensional stability, high optical transmittance and low acoustic attenuation. Moreover, to bring about the necessary phase delays, the delay line should be excited in a shear mode, and such a requirement introduces difficulties in the design and coupling of the shear mode transducers.

It is accordingly a primary object of the present invention to provide an optical correlator which utilizes the interaction of light with coded Raleigh surface waves in a solid medium.

Another object of the present invention is to provide an optical correlator in which coded Raleigh surface waves cause frustrated internal reflection of light energy propagating through a solid member.

Another object of the present invention is to provide an optical correlator in which frustrated internal reflection is employed to control the light energy emerging from a solid light-conducting member at spaced locations and impinging on a correlation mask.

Another object of the present invention is to provide an optical correlator in which coded signal information is imparted to a Raleigh surface wave which modifies the boundary surface of a light-conducting member so as to permit light energy to emerge therefrom at selected locations corresponding to the transparent portions of a spaced, coded mask.

Another object of the present invention is to provide an optical correlator wherein coded Raleigh surface waves change the size of an air gap between a solid, light-conducting member and a spaced plate and, in doing so, control the amount of light energy entering this plate at selected locations which may correspond to predetermined areas of a coded mask.

Other objects, advantages and novel features of the invention will become apparent from the following detailed description of the invention when considered in conjunction with the accompanying drawings wherein.

Figure 1:
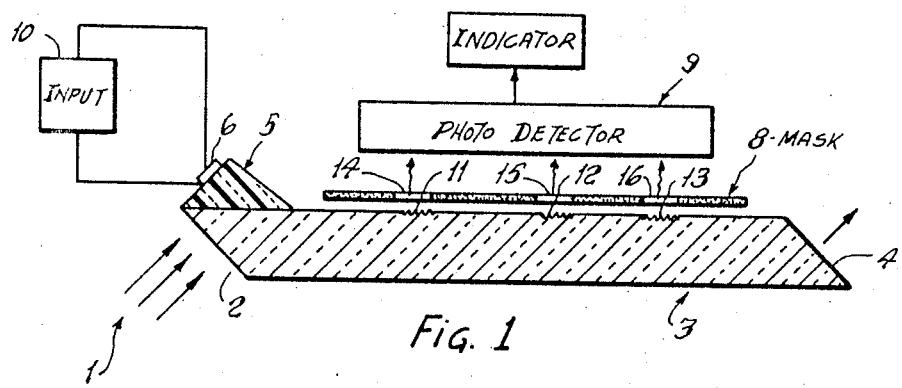
FIG. 1 illustrates one embodiment of the invention wherein the solid, light-conducting member is a parallel-faced plate.

Referring now to FIG. 1 of the drawings, a collimated beam of light 1, produced by a suitable light source and cooperating optical system, not shown, is directed towards the rear, oblique face 2 of a solid plate 3 made of an optically transparent material. This plate has parallel faces so that substantially of all of the light which enters it after a certain linear distance is contained within it because of the beam's relationship to the critical angle of internal reflection. Stated somewhat differently, the illumination of plate 3 is similar to the conventional edge illumination with most of the light energy traveling down the plate in an internally reflecting mode until it reaches the forward oblique surface 4 and emerges therefrom.

Mounted on plate 3, adjacent face 2 is a wedge 5 having a piezoelectric transducer 6 bonded to one face thereof. Wedge 5 and its associated transducer, it will be appreciated, act to launch a Raleigh ultrasonic surface wave along the upper face 7 of plate 3 when the transducer is excited. Other methods of exciting the surface wave exist. This particular method is mentioned only for illustrative purposes.

This Raleigh surface wave, as it propagates down the length of plate 3, causes angular deviations in the planar surface of the plate. These irregularities, where they occur, permit some of the light energy to emerge from the plate because the critical angle criterion is no longer present at these locations. All of this transmitted light is exposed to a mask 8 which contains coded opaque and transparent sections corresponding to the reference signal. The light passing through this mask is integrated by a suitable light-collecting system, for example, a lens (not shown), and applied to a photodetector 9. The output of this device thus provides an indication of the correlation between the code incorporated in mask 8 and the Raleigh surface wave train sent down the optical plate.

In the operation of the apparatus of FIG. 1, transducer 6 is excited by a coded signal 10 which may take the form of a carrier modulated "on" and "off" to duplicate some stream of digital information. The ultrasonic surface wave launched in response to this excitation will, for example, disturb portions of the top surface 7 of the plate 3 at locations 11, 12 and 13 at one particular point in time as it proceeds down the optical plate. Light energy, therefore, will emerge from the plate at these locations, pass through the adjacent aligned transparent portions 14, 15, 16 of mask 8, and be collected and focused on photodetector 9.

The spatial coincidence between the transparent sections of mask 8 and the modulated ultrasonic surface wave in the above example results in maximum signal output from photodetector 9 and an indication of the highest degree of correlation between the coded electrical signal 10 and the reference code built into mask 8.

Figure 2:
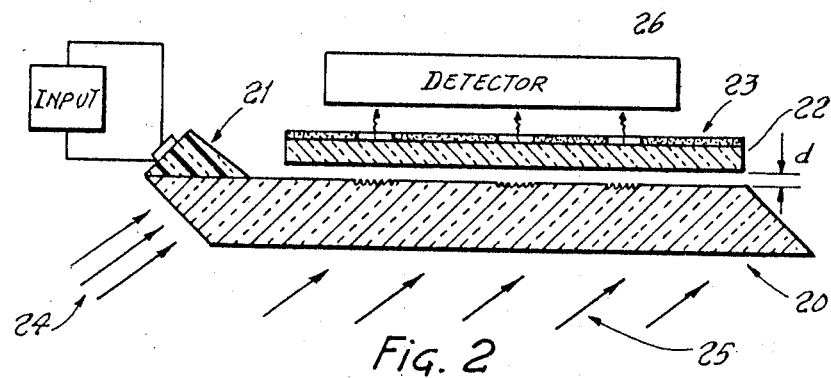
FIG. 2 shows an alternative arrangement wherein the coded Raleigh surface wave changes the dimensions of an air gap and the amount of light energy entering an adjacent, spaced plate.

In FIG. 2 there is shown an alternative embodiment of the correlator utilizing a similar optical plate 20 and Raleigh surface wave generator 21. Here, however, an optically transparent plate 22 is spaced above plate 20 at a distance $d$ which is on the order of or smaller than the wave length of the illuminating light. The correlation mask 23 rests on the top of plate 22 or is otherwise incorporated into this plate.

The method of illumination may be with a collimated beam 24 similar to beam 1 in the system of FIG. 1 and directed at an appropriate angle to the rear, oblique face of plate 20. An alternative method, and one that may, perhaps, be more desirable, involves a wider beam of collimated light 25 directed towards the bottom surface of plate 20 over an area equal to that covered by the mask 23 and its supporting plate 22. This beam, for greatest sensitivity, should be arranged to strike the upper boundary surface of plate 20 at an angle $\theta$ greater than the critical angle for total internal reflection.

When the light-conducting plate is illuminated at an oblique end face, there is a diminution of the light as it propagates down the plate. This mode of operation may be acceptable if the light lost from the plate is negligible or is statistically averaged by reflection from the other end thereof. Using the beam arrangement 25 shown in FIG. 2 avoids this problem of light attenuation and loss, since there is no dependence on how much light is previously removed from the beam.

When the ultrasonic Raleigh wave travels down the top of plate 20, distance $d$ is varied and, as a result, the amount of light transmitted to upper plate 22 likewise changes. If one plots the amount of light transmitted from plate 20 to plate 22 versus their separation in terms of the wave length of the illuminating light, the resulting curve will have a maximum at zero separation and fall off exponentially. Consequently, a maximum amount of light will again reach the photodetector 26 when the coded Raleigh surface waves are in spatial agreement with the optically transparent portions of correlation mask 23.

The normal spacing $d$ may be such that the system, in effect, operates at a point on the above curve where the positive and negative excursions of the upper surface of the light-conducting member due to the Raleigh wave do not have an averaging effect on the amount of light reaching the upper plate over any "on" period of the carrier. For example, the system may operate with only a negligible amount of light normally passing between the light-conducting plates, with the positive excursions of the surface substantially increasing this light and the negative excursions having practically no effect thereon.

The apparatus of FIGS. 1 and 2, it will be appreciated, only ascertains whether or not there is coincidence between the "on" ultrasonic signals and the transparent sections of the fixed correlation mask. These arrangements do not perform the complementary function of indicating whether or not there is also agreement between the "off" portions of the signal train and the opaque sections of the mask. For true correlation, there should be complete agreement throughout the signal train of each signal and no signal condition with each translucent and opaque section of the mask. Only the first condition is tested in the above systems.

Figure 3:
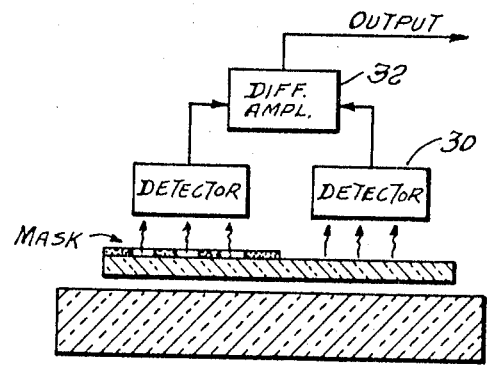
FIG. 3 is an end view of an arrangement for performing a complete matched filter analysis.

To perform a matched filter analysis, a system similar to the one shown in FIG. 3 may be employed. Here, the ultrasonic Raleigh wave carrying the coded information controls the amount of light reaching a pair of detectors 30 and 31 disposed side by side. Only one of these detectors, 31, for instance, has a correlation mask 32 interposed between it and the light-conducting plate 33.

It will be appreciated that detector 30 will therefore receive a measure of light representing the sum of all of the ultrasonic pulses present in the wave train, whereas detector 31 will receive an amount of light depending upon the degree of matching between these pulses and the transparent sections of the mask. Thus, if an extra ultrasonic pulse is present and occurs at a location corresponding to an opaque section of the correlation mask, this pulse will not contribute to the light energy reaching detector 32 but will contribute to the light energy reaching its companion detector 30. The outputs from the detector are therefore fed to a differential amplifier 32 and the output of this amplifier provides the measure of correlation.

Another way is to employ complementary coded masks disposed side by side above the light-conducting member and to again use a differential amplifying operation. If there is true correlation, one detector will develop a maximum signal while the other is generating a minimum.

Figure 4:
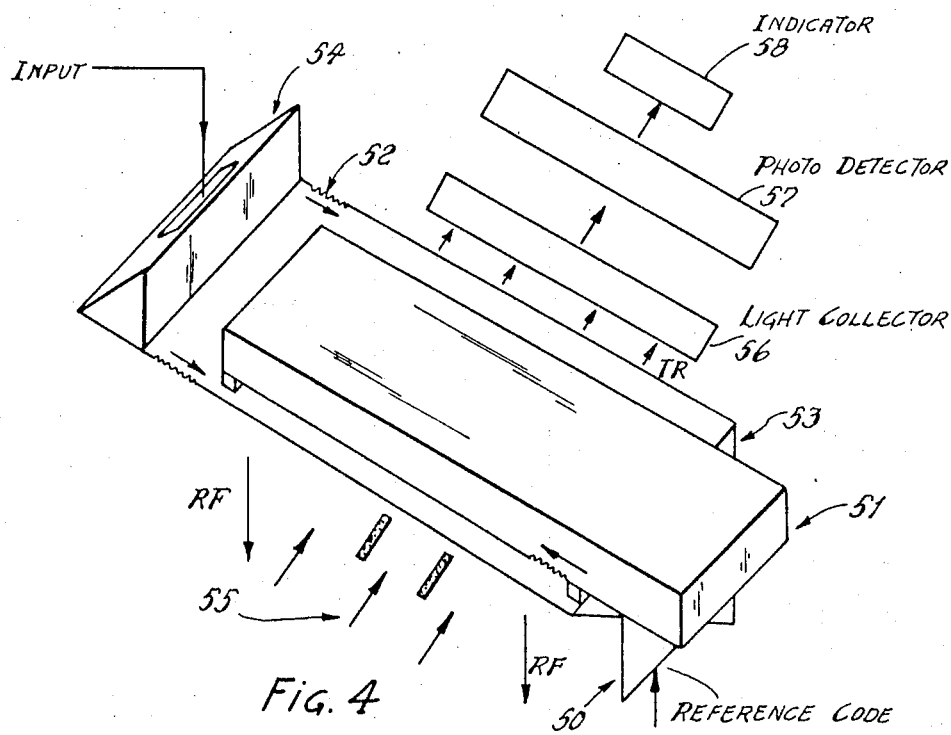
FIG. 4 illustrates an alternative embodiment in which the coded signal information and the reference code are both in the form of Raleigh surface waves excited in adjacent, light-conducting members.

In FIG. 4 there is shown an arrangement wherein the correlation mask is replaced by a Raleigh surface wave-generating device 50 and a cooperating light-conducting plate 51. This plate is spaced away from the top surface 52 of a prism 53 by the distance $d$, previously identified. Coded Raleigh surface waves are launched along surface 52 by an appropriate generator 54 which is excited by the information signal. The illumination of the apparatus is by a collimated beam of light energy 55 directed towards one face of the prism over its complete length.

In operation, a Raleigh surface wave coded in accordance with the intelligence travels down the top surface of prism 53 while a second Raleigh surface wave coded in accordance with the reference signal is sent down the confronting bottom surface of plate 51 in synchronism. Since the surface waves are traveling in opposite directions, the reference signal is time inverted before it is applied to generator 50. When both coded signals are in spatial coincidence and their compositions are in complete agreement, the distance $d$ between corresponding surfaces will be at a minimum, and a maximum amount of light energy will travel through the air gap, light collector 56, reach photodetector 57, and be observed at indicator 58. It will be appreciated, of course, that a suitable synchronizing provision should be incorporated in this system so that both coded signals appear opposite each other somewhere near the midpoint of plate 51.

Figure 5:
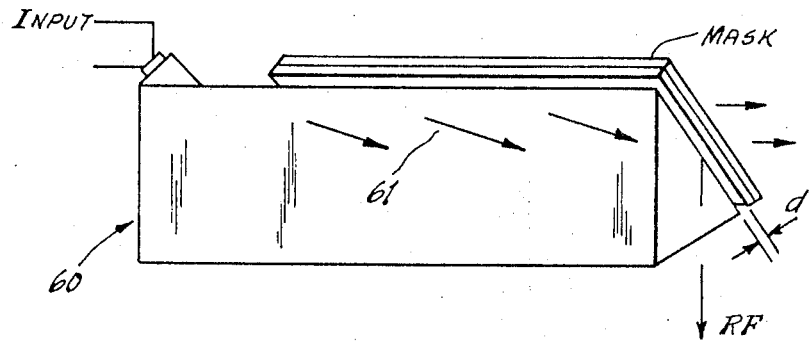
FIG. 5 is an alternative arrangement wherein the main light-conducting member is a section of prism.

In FIG. 5 there is shown an alternative construction similar to the arrangement of FIG. 2 but with the light-conducting member in the form of a prism 60 illuminated by light beam 61 over its overall length.

It should be appreciated that in each of the embodiments above-described all of the transmitted light may be collected by lenses, light pipes or fiber optics prior to its application to the photodetector. Also, the mask in the apparatus of FIG. 1, for example, may be replaced by a series of properly spaced light pipes positioned between the light-conducting plate and the photodetector at locations corresponding to those occupied by the transparent sections of the mask. Thus, these light pipes may serve both as the mask itself and the light collecting apparatus.

It should also be appreciated that the correlation mask may be a photographic negative or appropriate opaque depositions evaporated on light-conducting supporting plates.

In the various modifications which employ a transparent plate spaced above the light-conducting element, this plate should be made of a material which has an index of refraction matching that of the light-conducting plate. Also, in these systems the spacing $d$ may be achieved by appropriate dielectric films applied to selective areas on one or the other of the members.

Obviously many modifications and variations of the present invention are possible in the light of the above teachings. It is therefore to be understood that within the scope of the appended claims the invention may be practiced otherwise than as specifically described.

I claim:

1. An optical correlator comprising, in combination:
a light-conducting member having top and bottom parallel planar boundary surfaces and a pair of end surfaces;
means for illuminating one end surface of said light-conducting member such that substantially all of the light entering said member is internally reflected from said boundary surfaces as it proceeds through said member to the other end surface thereof;
a piezoelectric transducer mounted on the top planar boundary surface of said member adjacent said one end thereof;
said piezoelectric transducer being adapted to launch a Raleigh surface wave when excited by an electrical signal;
said Raleigh surface wave altering the planar condition of said top boundary surface and causing light energy to be emitted therefrom;
a mask positioned above the top planar surface of said light-conducting member;
said mask having finite opaque and light transparent areas corresponding to a reference binary signal;
means for detecting light energy which is emitted from said light-conducting member and thereafter passes through the transparent areas of said mask; and
means for indicating the amount of light energy so detected, thereby to provide a measure of the correlation between the electrical signal exciting said piezoelectric transducer and said reference binary signal.

2. An optical correlator comprising, in combination:
a light-conducting member having top and bottom parallel planar boundary surfaces and a pair of end surfaces;
means for illuminating one end surface of said light-conducting member such that substantially all of the light entering said member is internally reflected from said boundary surfaces as it proceeds through said member to the other end surface thereof;
a piezoelectric transducer mounted on the top planar boundary surface of said member adjacent said one end thereof;

said piezoelectric transducer being adapted to launch a Raleigh surface wave when excited by an electrical signal;

said Raleigh surface wave altering the planar condition of said top boundary surface and causing light energy to be emitted therefrom;

a mask positioned above the top planar surface of said light-conducting member;

said mask having finite opaque and light transparent areas corresponding to a reference binary signal;

means for producing a first electrical signal proportional to the total amount of light energy which is emitted from said light-conducting member;

means for producing a second electrical signal proportional to the amount of emitted light energy which passes through the transparent areas of said mask; and means for differentially combining said first and second electrical signals;

the resultant difference signal being an indication of the correlation between the electric signal exciting said piezoelectric transducer and said reference binary signal.